United States Patent [19]
Aho

[11] 3,797,045
[45] Mar. 19, 1974

[54] TURNING DEVICE FOR THE BAIL OF AN EAR PROTECTOR

[76] Inventor: Yrjo Aho, Kuninkaantie, Westend, Finland

[22] Filed: Aug. 11, 1972

[21] Appl. No.: 280,042

[30] Foreign Application Priority Data
Aug. 12, 1971 Finland.............................. 2253/71

[52] U.S. Cl................................... 2/209, 179/182
[51] Int. Cl............................................... H04r 1/10
[58] Field of Search ........ 2/209, 8; 179/156 R, 182, 179/; 74/553, 527; 240/61.05, 61.6

[56] References Cited
UNITED STATES PATENTS

| | | | |
|---|---|---|---|
| 678,170 | 7/1901 | Gardner............................ | 2/209 X |
| 2,192,520 | 3/1940 | Levy et al......................... | 74/553 X |
| 2,501,107 | 3/1950 | Volkmann........................ | 179/156 R |
| 3,457,376 | 7/1969 | Kreisel et al.................... | 179/182 R |

*Primary Examiner*—James R. Boler
*Assistant Examiner*—Peter Nerbun

[57] ABSTRACT

An ear piece having a bail joined to ear piece through fork-like members and connecting means at the end of said fork-like members on the outer circle of the ear piece and near to the packing level of said ear pieces turning means for said bail ring-shaped means carrying said connecting means, bearing means in said ear pieces supporting said ring-shaped means so that when the user wants to turn the bail over the top of his head on his neck or into another position of use, the ring means rotates in its slot with the bail and the fork-like member, while the ear pieces remain in position.

3 Claims, 2 Drawing Figures

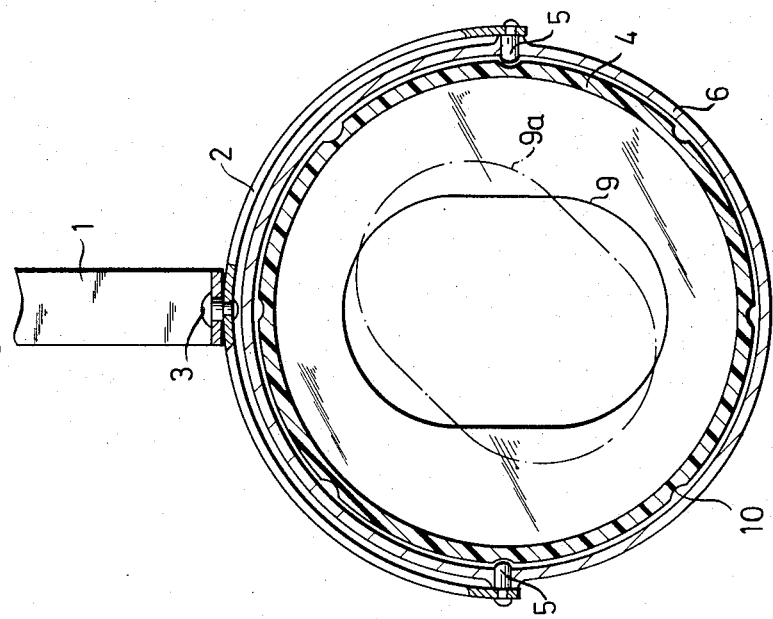
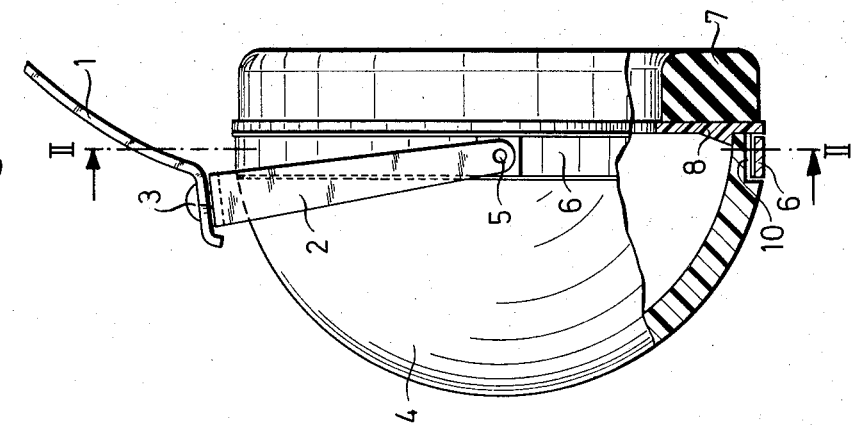

TURNING DEVICE FOR THE BAIL OF AN EAR PROTECTOR

In ear pieces of the convex type the bail is generally arranged so that it goes over the top of the head or as in the type used with a protective helmet, for example, behind the neck. In view of changing circumstances of use, such general types have been developed wherein the bail is fastened to the ear cups or pieces so that in addition to the aforementioned positions the bail can be turned even under the chin.

A general drawback of turnable fastening is the defective holding of the elected position, because in these types the bail is regularly fastened to a rather small joint placed in the middle of the ear cups, wherein it is difficult to bring about sufficient holding so as to prevent the bail from winding by itself. Further, when using known solutions, the users are tied by other drawbacks of this type of middle joint such as, for example, that the curve of the bail becomes broader than when the fastening of the bail takes place on the outer circle of the ear piece or cup and nearer to the head of the user by utilizing fork-like parts.

Naturally, the simplest method for bringing about the afore-described general type is to make a round cup instead of an oval one, in which case the fastening joint of the bail can be stationary, because if desired, the cup can be wound on the skin so that the bail comes into the desired position. This kind of solution presupposes, however, that even the openings in the bottom part and in the packing of the ear cup for the ear lobe are round instead of being oval, which again in view of sound damping has been found out to be disadvantageous.

An object of this invention is to provide an ear piece, especially a protector supplied with a turnable bail, in which the bail safely keeps the elected turning position and the modelling of the bail is not restricted by the means of fastening it.

A further object of this invention is to provide a regulating device of the bail of an ear piece or protector, in which the bail is attached to the ear cups by means of fork-like parts and at the ends of the fork is situated joint pins on the outer circle of the ear cup and near the packing level of the cup.

It is a characteristic of this invention that the joint pins of the fork are supported with bearings on a ring-like part, not on the ear cup itself, which ring-like part is supported with bearings on a slot situated parallel with the packing level in the ear cup so that when the user of the ear protector wants to turn the bail over the top of his head, on his neck or into another position of use, the ring rotates in its slot with the bail, while the ear cups remain in their places.

The objects and advantages of this invention will be better understood when viewed with the accompanying drawing, wherein:

FIG. 1 is a side sectional view of the invention along line I of FIG. 2.

FIG. 2 is a front sectional view of the invention along line II of FIG. 1.

As seen in the drawing, the bail 1 of the ear protector is attached at its ends to the fork 2 through the rivet 3, the juncture allowing as usual a small rotating movement round the rivet 3 on the horizontal plane necessary for the ear cup, when it is setting itself in place. At the ends of the fork 2 there are connecting or joint pins 5, which allow the setting movement of the ear cup 4 on the transverse vertical plane uniting the user's ears.

The joint pins 5, which in known constructions are directly connected with the ear cup 4, are shown in the drawing in accordance with this invention supported with bearings through the ring 6. The ring 6 is supported by bearings in the slot in the ear cup 4, which on the side towards the packing 7 is closed by the bottom part 8.

When the bail 1 is turned on the longitudinal vertical plane, the ring 6 slides in its slot, the ear cup 4 stays in its place and the oval openings 9 in the bottom part 8 as well as in the packing 7 remain in the vertical position implied by the ear lobe. For the sake of simplicity, the relative rotating movement between the bail and the ear cup is presented in the drawing, as if the bail remained in its place and the ear cup would itself (broken line 9a).

For bringing about a broken suitably graduated turning movement and for securing the stability of the chosen position of the bail, the bottom of the slot may be supplied with the grooves 10, into which the ends of the joint pins 5 sink because of the elasticity of the fork 2.

Obviously, the embodiment shown is exemplary only and a wide variety of embodiments may be devised without departing from the scope and spirit thereof.

What is claimed is:

1. An adjustable ear piece comprising a circular ear piece provided with a recess around the circumference thereof, said recess being provided with a plurality of spaced pairs of transverse detent grooves at the bottom thereof, a ring member circumferentially and movably disposed within said recess, a resilient fork member extending around at least a portion of said ring member, a pivot pin mounted adjacent each end of said fork member to pivotally mount said fork member to said ring member, said pivot pin extending through said ring member resiliently engaging with said spaced pairs of detent grooves in said recess, means attaching said bail member to said fork member, whereby said bail member may be moved forwardly or backwardly of the top of the head without moving said ear piece by turning said bail and said fork member to move said ring member circumferentially in said recess until said pins engage the desired detent grooves for resiliently locking the position of the bail member with respect to said ear piece.

2. An adjustable ear piece as claimed in claim 1 wherein said fork member extends around at least a half of said ring member and said spaced pairs of detent grooves are arranged in opposed pairs.

3. An adjustable ear piece as claimed in claim 2 wherein said spaced pairs of detent grooves are uniformly spaced.

* * * * *